July 21, 1931. W. E. FISHER 1,815,402

FISHING LINE ALARM

Filed Aug. 19, 1929

Inventor,
Wilbur Elder Fisher

By

Patented July 21, 1931

1,815,402

UNITED STATES PATENT OFFICE

WILBUR ELDER FISHER, OF EVANSVILLE, INDIANA

FISHING LINE ALARM

Application filed August 19, 1929. Serial No. 387,003.

This invention relates to that general class of alarms designed for operation by a fishing line when a fish nibbles or strikes the bait, the purpose being to apprise the fisherman so that he may catch and haul in the fish.

The alarm is adapted for use in connection with throw lines, trot lines, or any fishing lines.

The object of the invention is the provision of a simple, durable, and compact fishing line alarm which will be sensitive to pulls or jerks on the fishing line and will be reliable in its action of sounding the alarm when the fishing line is disturbed.

The invention comprises a foldable standard which has a prong that can be stuck into the ground or into woodwork to hold the device, a flexible reed or spring carried by the standard and to which the fishing line may be connected, and an alarm bell having a button or releasable trigger positioned to be operated by the flexible reed or spring so that the slightest twitching or jerking of the fishing line will cause the alarm to be sounded.

The bell may be of the single-stroke variety or it may be of the rotatable wind-up gong type which, when its releasing mechanism is tripped sounds a continued alarm.

Figure 4:
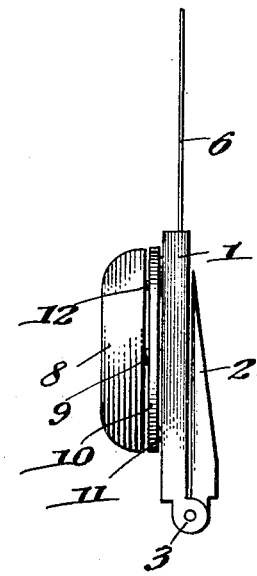
Fig. 4 is a detail side elevation showing the prong folded.
Figure 5:
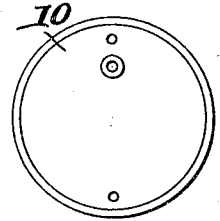
Fig. 5 is a view looking toward the base of the gong or alarm, the push button being removed.

The parts of the device are carried by a standard comprising an upper part 1 and a lower prong-like part 2, connected by a rule-joint 3. The joint enables the prong 2 to be folded upon the section 1 so that the device may be arranged in compact form to be carried in the pocket of the user or readily transported from place to place, as in Fig. 4.

The section 1 is hollow, as shown at 4. Secured at 5 to the section 1 and extending upwardly through the hollow part 4, is a vibratory reed or spring 6 which, being free to vibrate in the hollow part 4 and extending considerably above the section 1, has a relatively long vibratory part, rendering it sensitive to any twitching, jerking or pulling on the fishing line 7, it being understood that the line 7 is connected to the upper end of the rod or spring 6 in any suitable manner.

The alarm 8 may be a gong or bell secured by a standard 9 to a base 10 and provided with a single stroke clapper, or, it may be a wind-up bell having a continuously operating clapper. The base 10 is secured by screws 11 to the section 1.

The clapper of the bell is operated, or released for action, according to the type of bell employed, by a slidable push button 12 which projects through an opening in the section 1, into the hollow interior 4 in close relationship to the flexible rod or spring 6.

Figure 1:
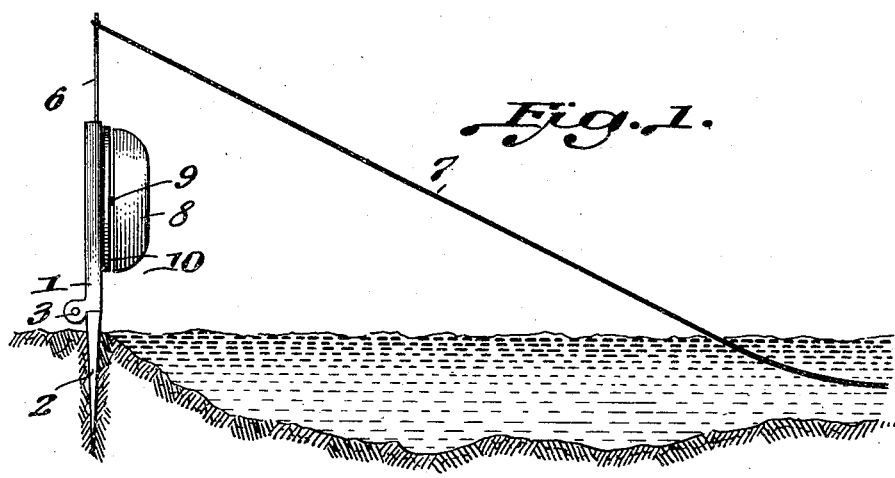
Figure 1 is a view showing the invention in use on the bank of a stream or lake.
Figure 2:
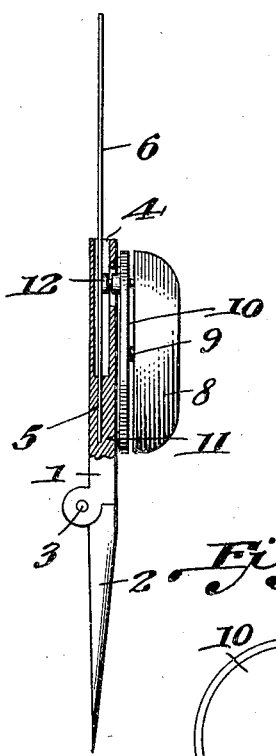
Fig. 2 is a detail side elevation, partly in section, showing the device ready for use.
Figure 3:
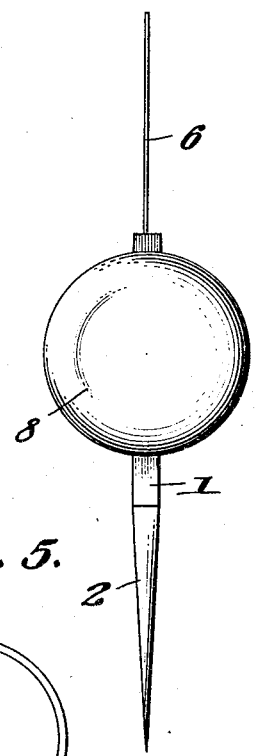
Fig. 3 is a front view thereof.

In using the alarm, the prong 2 is forced into the ground or into a piece of wood or into any suitable joint in a boat, where fishing is to be had as illustrated, for instance, in Fig. 1, and the section 1 then arranged vertically and the line 7 connected to reed 6. Whenever a fish nibbles at the bait or swallows it, the vibration imparted to the reed 6 releases or operates the push button 12 and the gong or bell 8 then sounds, attracting the attention of the fisherman so that he can pull in his line.

What I claim is:

1. In a fishing line alarm, the combination with a hollow standard, of a vibratory reed secured to said standard and having a part of its length located within said hollow part thereof and extending beyond said standard, affording a connection for a fishing line, and an alarm connected to the standard and provided with means for its operation or release, said means projecting into the hollow part of the standard in position to be engaged by the reed when the latter vibrates.

2. The herein described fishing line alarm comprising a two-section standard, the sections of which are connected by a rule-joint, the lowermost section being in the form of a prong and adapted for extension into alinement with the remaining section or to be folded against said remaining section, the remaining section being hollow, a vibratory reed extending lengthwise of the said section and having its inner end and a part of its length arranged to vibrate within the hollow interior of said section and the remaining portion of its length projecting beyond the hollow section for the adjustment of a fishing line, and an alarm connected to said hollow section and having a push button arranged to be engaged by the reed.

3. In a fishing line alarm, the combination with a rigid standard, of an alarm carried by said rigid standard, and a vibratory reed connected to, and projecting from, said standard and to which the fishing line may be connected, said reed, by its vibration in respect to the standard, controlling the operation of said alarm.

In testimony whereof I affix my signature.

WILBUR ELDER FISHER.